Jan. 12, 1943.                F. A. FRITZSCH                2,308,417
                              TOOL MOVING MEANS
                         Filed March 18, 1941           7 Sheets-Sheet 5

Jan. 12, 1943.                F. A. FRITZSCH                2,308,417
                              TOOL MOVING MEANS
                         Filed March 18, 1941           7 Sheets-Sheet 6

INVENTOR
BY
ATTORNEY.

Jan. 12, 1943.  F. A. FRITZSCH  2,308,417
TOOL MOVING MEANS
Filed March 18, 1941  7 Sheets-Sheet 7

Patented Jan. 12, 1943

2,308,417

UNITED STATES PATENT OFFICE 2,308,417

TOOL MOVING MEANS

Frank A. Fritzsch, Cincinnati, Ohio, assignor to The Lodge & Shipley Machine Tool Company, Cincinnati, Ohio, a corporation of Ohio Application March 18, 1941, Serial No. 383,986

11 Claims. (Cl. 82—21)

My invention relates primarily to means for moving the cutting tool or tools in a lathe and for controlling the directions of movements of the same, and is especially useful in automatic lathes, and is employable, for example, in lathes in which the tools have closed cycles of movements.

In automatic lathes, the cycles of movements usually include facing cycles in which the tools act to face the ends of rotating pieces of work; turning cycles in which the tools cut the lengthwise periphery of the rotating work, and cycles which include reducing the diameters of portions of pieces of work to substantial extents for providing the pieces of work with reduced portions, with shoulders and other configurations, and in which, for instance, substantial amounts of excess metal are removed before feeding the tool or tools lengthwise of the work.

My invention is admirably adapted to the latter field but is not restricted thereto. It is employable in many situations in which it is desired to impart movement in more than two paths to an actuated element, as the cutting tool in a lathe or in a path which is the resultant of movements in a plurality of paths.

It has been a usual practice heretofore to force or dig such tools into the work perpendicularly to its axis of rotation for feeding the tools into required positions in the work prior to lengthwise feeding between the tools and the work for turning the work.

It has heretofore been difficult to grind tools for so digging into and turning the work and to maintain the cutting edges of the tools in prime condition for such dual functions, and to provide proper clearance for the cutting edges of such tools. This is especially true when using tools the cutting edges of which have a tendency to be brittle, such as carbide tip tools and tools of a similar nature. The cutting edges of such tools for digging in and turning, due to their cutting angles, have a tendency to drag on the work and cause a wedging action when digging into the work, and to exert undue pressure upon the work, resulting in deflections of the work from its normal central position, producing a hump in the finished turned work, in making the matching of cuts between two or more turning tools difficult, and in tending to create chatter between the tool and the work. These objections are obviated in my improved device.

In automatic cycle lathes, there are usually two characters of movements, one quick traverse movements and the other tool feeding movements, the quick traverse movements being employed for advancing and retracting the tool or tools for properly positioning the same for cutting and for returning the tools to initial positions after the cutting has been performed, and the feeding movements being employed proximate to and during the cutting movements. Examples of machines of this character are shown, described and claimed in United States Letters Patent No. 1,600,401, granted September 21, 1926, for Machine tool carriage, on the application of Francis B. Cockburn; No. 1,600,650, granted September 21, 1926, for Lathe, on the joint application of Edward S. Bird and Francis B. Cockburn, and Patent No. 2,105,913, granted January 18, 1938, for Lathe, on the application of Frank A. Fritzsch, applicant herein. The Cockburn patent is directed primarily to means for obtaining tool movements; the Bird and Cockburn patent is directed mainly to the controls for such tool movements; and the Fritzsch patent is directed to both means for obtaining tool movements and controls for the same. My invention is an improvement on the devices of these patents.

Objects of my invention are to provide novel means whereby to obviate such objections and whereby improved cutting tools may be employed; to provide novel means whereby a combined controlled infeed and longitudinal feed may be imparted to the tool; to provide novel means whereby a tool may be employed having a cutting nose which merges into an advance cutting edge and having a clearance at the rear side of the tool between the body of the tool and the face cut in the work by the nose, so as to minimize strains on the work perpendicular to its axis, and thus prevent chattering and uneven cutting longitudinally of the work, upon lengthwise feed between the tool and the work.

It is an object of my invention, further, to provide novel means whereby to reduce the cutting resistances upon the cutting edges, and whereby the cutting tool may be provided with a cutting nose and with a clearance in rear of said nose, and the path of the cutting tool be so directed as to remove scraping and dragging actions upon the side of the tool.

It is an object of my invention, further, to provide novel means whereby the cutting tool is caused to enter the work at an angle to the axis of the work; and, further, to provide novel means whereby such angle and movement may be adjusted to accommodate different characters of material and cutting tools having different properties of cutting resistances; and, further, to provide novel means for tool movement whereby the bodies of cutting tools may be increased for absorbing heat from the chip being cut in order to increase the life of the cutting tool and its cutting edge.

It is a further object of my invention to provide novels means to produce a combined infeed and longitudinal feed of the tool into the work, to place the cutting edge of the tool in its proper position with relation to the axis of rotation of the work for lengthwise feeding between the tool and the work, to provide space lengthwise of the work between the plane perpendicular to the axis of rotation of the work, in which the cutting nose or end of the tool is located, and the rear conical face of the groove being cut in the work, by such combined infeed and longitudinal feed, in which space the rear or retreating portion of the nose of the tool is widened to add to its body for strengthening the same and for absorbing more of the heat transmitted from the chip to the tool, and to provide a clearance angle between the rear edge of the tool and such conical face to prevent rubbing and wedging pressure between such rear edge and the work.

A further object of my invention is to provide novel means whereby combined movements are imparted to the tool so that the tool moves diagonally in the work without interfering with or being detrimental to the various movements between the tool and the work in performing cutting cycles and the controls therefor.

My invention consists in novel means for attaining the objects stated; further, in providing novel means for movements of the tool support to obtain the movements indicated; further, in providing novel means for obtaining relative and combined movements of supports, including a tool support; and, further, in providing novel means for movements of said supports whereby said tool support is movable perpendicularly to the axis of the work, said supports are movable lengthwise of the work for lengthwise movement of the tool support along the work, and for combined positive movements of said supports relatively to each other to obtain combined approaching and lengthwise movements between the tool support and the work.

My invention consists, further, in providing novel means for diagonal movement of a tool in a portion of a box cycle; further, in providing novel means for compound movements of superposed supports to impart a diagonal path of movement to the tool; further, in providing novel means whereby to feed a tool in a diagonal path with a clearance angle in the plane of the cutting edge of the tool; and, further, in providing novel means for crosswise and lengthwise feeding movements of the tool and combinations of said movements for determining tool paths.

It is a desideratum in modern machine tool practice to produce feeding movements between the tool and the work at speeds which are maximum during the most extended cutting movements. It has been found that if there be a contributing factor which reduces such maximum desired speed during a portion of such feed, the whole feed throughout its path must be correspondingly reduced. One such factor reducing speed of feed has heretofore been the digging in of the tool, that is, moving the cutting tool perpendicular to the intended surface to be cut, to place the point of the tool at the point of greatest depth of cut, the speed of feed of the tool throughout the entire cutting action of the tool being correspondingly reduced. I have provided novel means to automatically reduce the speed of infeed of the tool during the digging in of the tool, whereby the speed of feed for the balance of the cutting of the tool may be increased, that is to say, to make the speed of feed of the tool throughout the major portion of its cutting path not dependent on its speed during digging in, whereby to increase the speed of normal feed of the tool, and further to produce this result in connection with performing cutting by the tool in closed cycles. The production of the machine is thereby correspondingly increased.

My invention will be further readily understood from the following description and claims, and from the drawings, in which latter:

Figure 2:
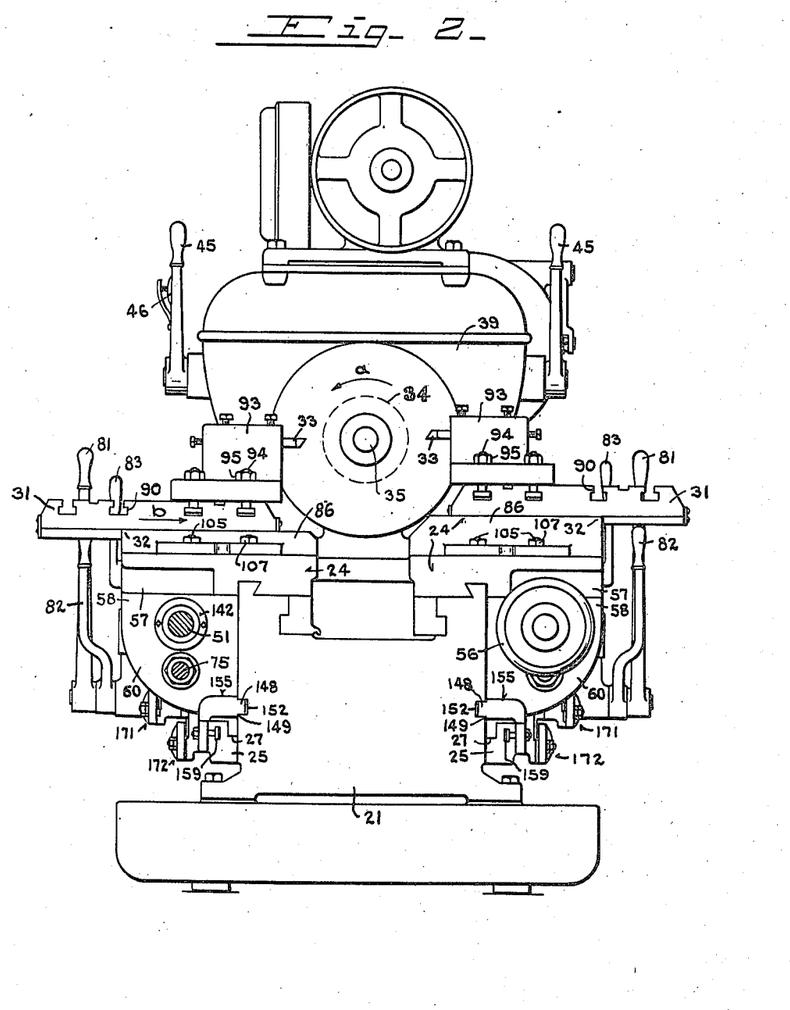
Fig. 2 is an end view of the same, viewed from the tail stock end, and with the tail stock, and the bearings at the tail stock end for the feed screw and the tappet rod, omitted.
Figures 3, 4:
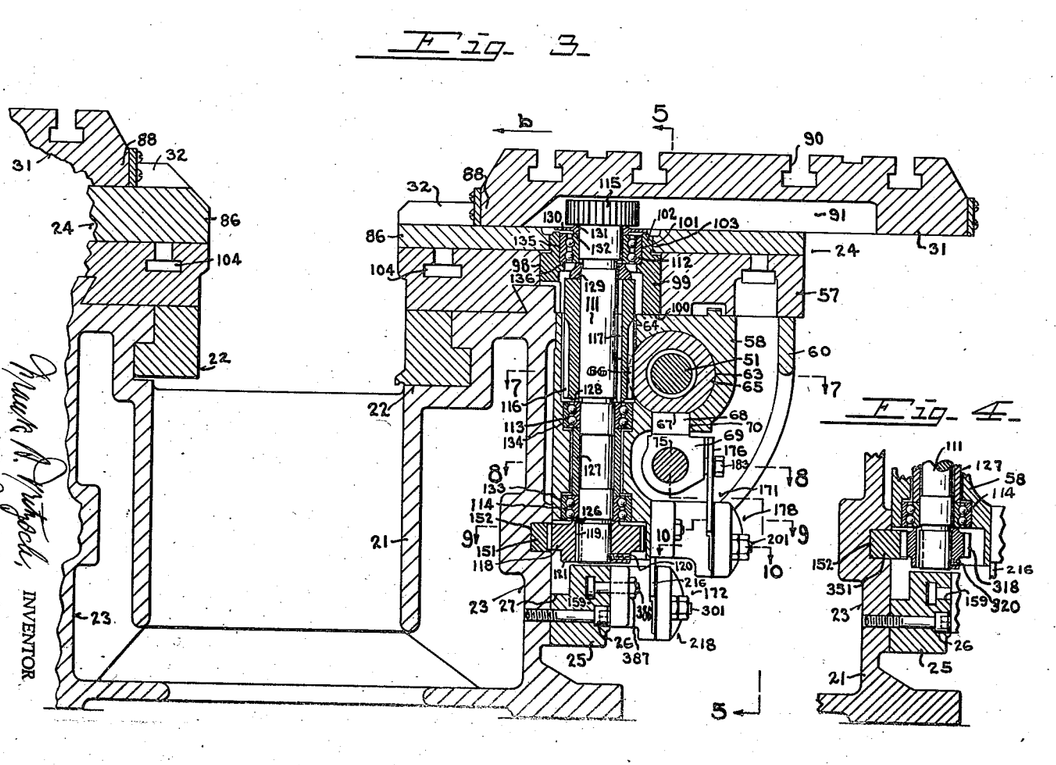
Fig. 3 is a vertical cross-section of the same, taken on the line 3—3 of Fig. 1, and partly broken away.
Fig. 4 is a vertical cross-sectional detail view of a modification of the same, taken on the same section line.

I have exemplified my improved device (Figs. 1, 2 and 3), in an automatic lathe having carriages, tool supports and operating and control means for the same at the respective sides of the bed, the respective tool supports being arranged to carry a tool or tools operating at the sides of work rotating between them. I shall describe my improved device as applied at one side of the work, namely, at the front of the lathe. My improved device at the other side of the work, when employed, is substantially a duplicate of the front mechanisms, the rear parts where shown, being designated by similar reference numerals, and further description thereof being deemed unnecessary.

The lathe exemplified comprises a bed 21 along which there are guideways 22, 23, for slidably supporting carriages 24, movable lengthwise of the bed at the respective sides thereof.

A guide strip 25 extends lengthwise of the bed at each side of the bed and is secured to the bed by screws 26. Each of the guide strips is provided with a rabbet 27 into which the lower end of the apron of the carriage extends, to help form the guideways 23 at the respective sides of the machine. The respective carriages each supports a cross tool slide 31 movable crosswise of the carriage in a guideway 32 (Figs. 1, 2, 3, 5 and 6), and supporting a tool or tools 33, singly or in gangs, and arranged to operate upon the work 34 between the same, the work rotating normally in the direction of the arrow $a$, and being supported between a usual head center 35 and a usual tail center 36, respectively located in a head spindle 37 and a tail spindle 38, respectively in a head-stock 39 and a tail stock 40 suitably supported on the bed, the tail stock being adjustable lengthwise of the bed and fixed in adjusted positions on suitable guideways in usual manner, and the work being rotated by being fixed to the head spindle or a face plate 42 rotatable therewith in usual manner. Suitable driving means are provided for rotating the head-stock spindle, rotating the work at desirable speeds, or permitting the work to be at rest, controlled by suitable handles 45, 46 and 47, as more fully explained in the Cockburn patent and the Bird and Cockburn patent aforesaid.

At each side of the machine there is a feed screw 51 rotatable at suitable speeds by driving gearing operated from driving means at the head-stock and automatically controlled by suitable control means located wholly or partly in or extending into a suitable control and transmission casing 52 at the head end of the lathe. The feed-screw is journaled at its respective ends in a bearing 53, fixed to the tail end of the bed and in a bearing in the transmission casing, and includes a driving part having suitable releasable connection with the feed screw. The feed screw is provided with a hand wheel 56 for hand setting of the parts actuated by the screw, when the releasable connection is released, all as more fully shown and described in said last-named patents.

The carriage 24 comprises an upper supporting plate 57 and an apron 58 provided with end brackets 59, 60, rigidly secured together.

The apron is provided with a horizontal bore 63 and a vertical bore 64, which intersect each other at right angles. A sleeve 65 is slidably engaged in the horizontal bore 63, and has teeth 66 at one side thereof, which project into the vertical bore and form a rack on said sleeve. The sleeve has an attaching face 67 at its bottom, against which the upward extension 68 of a traveler block 69 is rigidly secured by screws 71. This upward extension forms a slide strip slidably guided in a slot 70 in the lower wall of the horizontal bore 63 in the apron to prevent rotation of the sleeve. (Figs. 3, 5, 7 and 8.) A feed screw nut 73 has internal threads engaged by the corresponding threads of the feed screw. The feed screw passes loosely through the bore of the sleeve 65. The feed screw nut and the rack form a connected rack and nut member. The feed nut is fixed non-rotatively to the upward extension 68 of the traveler block at the end of the sleeve, by screws 72 and a positioning pin 74, and the feed nut, the rack sleeve, and the traveler block and its extension form a rigidly connected traveler block unit.

A transmission control rod 75, shown screwthreaded (Figs. 1, 2, 3 and 5), has nuts 76, 77, and jam nuts therefor adjustable lengthwise thereon, to form tappets on a tappet rod arranged to be engaged by the respective ends of the traveler block 69, loosely traversing the tappet rod. The traveler block forms a tripping member for the tappet rod. The tappet rod is slidable endwise at its respective ends in a bearing 79, located on the tail end of the bed and in a bearing in the casing 52, and extends into said casing. The feed screw also extends into the casing for having control and transmission means connect with it; such control and transmission means being controlled in part by the movement of the tappet rod. A sleeve 80 has threaded engagement with the tappet rod and is interposed between the tappet 77 and the traveler block 69. It is shown engaging the nut 77 and may be regarded as an extension of said nut. Such controls take place during automatic control of the mechanism in the performance of cycles of operation. Manual control may be effected by the levers 81, 82 and 83. Such structures and controls are more fully shown and described in said last-named patents, to which reference is made. A sleeve 84 threaded to the tappet rod may coact similarly with the tappet 76.

The top of a swivel block 86 has the dovetail cross groove 32 as a slideway with which coacts the corresponding slide projection 88 of the tool holding slide 31. (Figs. 1, 2, 3, 5 and 6.) A suitable gib 89 is interposed between the slide and slideway for slidably fitting the tool slide upon the swivel block. The cross or tool holding slide has the usual tool attaching T-slots 90 in its upper face, and has in addition a longitudinal depression or cavity 91 in its lower side within which is fitted and fastened a gear rack 92. The slide rack 92 is transmittingly connected with the feed nut rack 66 in manner to be presently described. A suitable tool or gang of tools is arranged to be suitably secured to the tool slide. A single tool is exemplified at 33 clamped to the tool slide by a clamp box 93 clamped to the tool slide by bolts 94, the heads whereof are adjustable in the slots 90, clamp nuts 95 being threaded over said bolts and clamped upon the clamp box.

The carriage is provided with a circular opening 98 extending downwardly to the apron portion of the carriage. (See Figs. 3, 5 and 6.) A block 99 is located in said opening and rests on the bottom 100 thereof and is fixed non-rotatively therein. It is provided with a central bore 101 in line with the bore 64 in the apron and with a journal boss 102 about which a bearing 103 in a swivel block 86 is journaled. The swivel block rests on the upper face of the carriage and is capable of rotative movement and adjustment thereupon about the boss 102 as a pivot. A circular T-slot 104, concentric with the journal boss 102 is provided in the upper side of the carriage, into which slot are engaged the heads of bolts 105 having their shanks extended upwardly through holes in the swivel block and having nuts 107 threaded thereover, whereby the swivel block may be clamped in any desired angular position on the carriage.

An upright shaft 111 is journaled in an upper bearing 112 in the pivot block and in an intermediate bearing 113 and a lower bearing 114 in the apron, these bearings being shown as ball bearings. An upper gear 115 is fixed to the upright shaft, as by being made inegral therewith, and extends into the cavity 91 in the cross-slide and meshes with the rack 92 on said cross-slide in said cavity. An intermediate gear 116 is rotatively fixed to the upright shaft 111, as by having groove and key connection 117 therewith, and is meshed by the rack 66 on the sleeve 65 for rotating the upright shaft selectively in reverse directions when the rack sleeve is moved axially selectively in reverse directions with relation to the carriage. A lower gear 118 is also rotatively secured to the upright shaft, as by having groove and key connection 119 therewith, and is held endwise on said shaft by releasable headless set screws 120 threaded in the hub 121 of said gear and entering a sunken spot in said shaft.

The upper face of the gear 118 has an annular flange 126 which coacts endwise with the inner race of the lower bearing 114. (See Fig. 3). A sleeve 127 surrounds the upright shaft and rotates therewith and is located between the inner races of the lower bearing 114 and the intermediate bearing 113 for separating the same. The intermediate gear 116 has a lower annular shoulder 128, which coacts endwise with the inner race of the intermediate bearing. A separating collar 129 is located endwise about said shaft between the intermediate gear 116 and the inner race of the upper bearing 112. A protecting plate 130 rotates with the upright shaft, and is provided with annular shoulders 131, 132, located endwise between the inner race of the upper bearing 112 and the upper gear 115. These hubs, sleeves, gears and inner races form a connected means for locating the gears and races axially, and locating the same in endwise relation on the shaft. The outer races of the ball bearings are located in annular rabbets 133, 134 in the wall of the bore 64 and an annular rabbet 135 in the wall of the bore 101 in the pivot block. The outer race of the upper bearing rests on an annular shoulder 136 which forms the bottom of the rabbet 135 for supporting the upright shaft by means of the upper radial and end thrust ball bearing 112.

The rack sleeve 65 and traverse nut 73 may be regarded as a unit non-rotatively secured within the apron so as to be fed or rapid traversed longitudinally upon the screw 51 in forward or return direction respectively toward the head stock or toward the tail stock depending upon the direction of rotation of the screw, and at a speed determined by the speed of rotation of the screw. The nut structure moves the carriage lengthwise of the bed when engaged with the carriage and provision is made for the nut structure to move freely within the carriage apron within regulatable limits for imparting motion to the tool slide mounted upon the carriage. Thus the nut is utilized for both carriage movement upon the bed and tool slide movement upon the carriage. Such carriage movements and tool slide movements are selectively quick traverse movements, forward or back, or slower feed movements, dependent upon the automatic set up and actuations by the control mechanisms, as more fully shown and described in the aforesaid Cockburn patent and Bird and Cockburn patent.

The screw shaft 51 and the transmission control rod 75 extend through openings in the opposite end bracket walls of the apron. (Figs. 1, 2, 5 and 7.) The respective end walls are provided with arresting means 141, 142 for the nut structure, for translatingly connecting the nut structure and carriage. The nut structure is free to travel between these arresting means without imparting any translating movement to the carriage, during which travel the nut structure by its rack imparts motion to the tool slide.

The distance of such translative movement of the nut structure upon the screw shaft 51 toward the head stock is limited by the arresting means 141, exemplified as a screw sleeve stop 143, loosely traversed by the screw. The screw sleeve stop is adjustable endwise in the end wall 59 of the carriage and fastened in endwise adjusted position, as by forming the screw sleeve stop as an externally threaded sleeve having lengthwise adjustment in an internally threaded collar 144 rigidly secured by a set bolt 137 in the opening in the end wall bracket 59 of the apron. The wall of said opening is provided with a graduation mark 138 with which the graduations on a graduated adjusting nut 139 are arranged to be registered. The graduated adjusting nut is splined by a key 140 in a groove 145 in the sleeve stop 143, so that upon rotation of the graduated adjusting nut in either direction the sleeve stop will also be rotated and translated in corresponding direction in the internally threaded collar 144 to locate the sleeve stop in axial direction. A jam nut 146 holds the sleeve stop in adjusted positions, all as in said last-named patents more fully shown and described, to adjustably limit endwise movement of the nut structure toward the head stock with relation to the carriage. The arresting means 142 may be similarly constructed, or said last-named arresting means may consist of an arresting plate secured to said end wall 60 and freely traversed by said screw 51 but arranged to be actuated by said nut structure in movement of the latter toward the tail stock to so move the carriage, as in said last aforementioned patents more fully disclosed. Such movements of the carriage toward the head stock or the tail stock continue until traverse of the feed nut structure is stopped either by discontinuance of feed screw rotation or reversal of its rotation, as in said aforementioned patents more fully disclosed.

Figure 1:
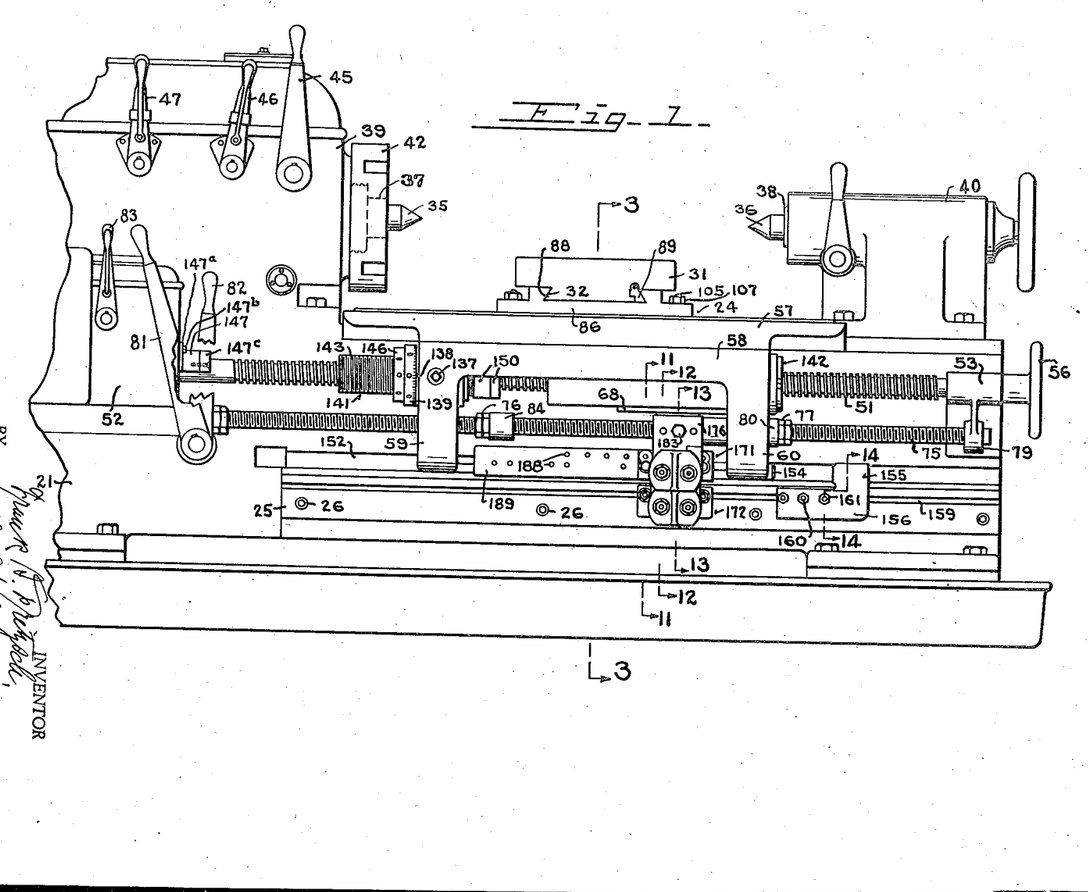
Fig. 1 is a front elevation of a lathe embodying my invention, partly broken away.
Figures 5, 6:
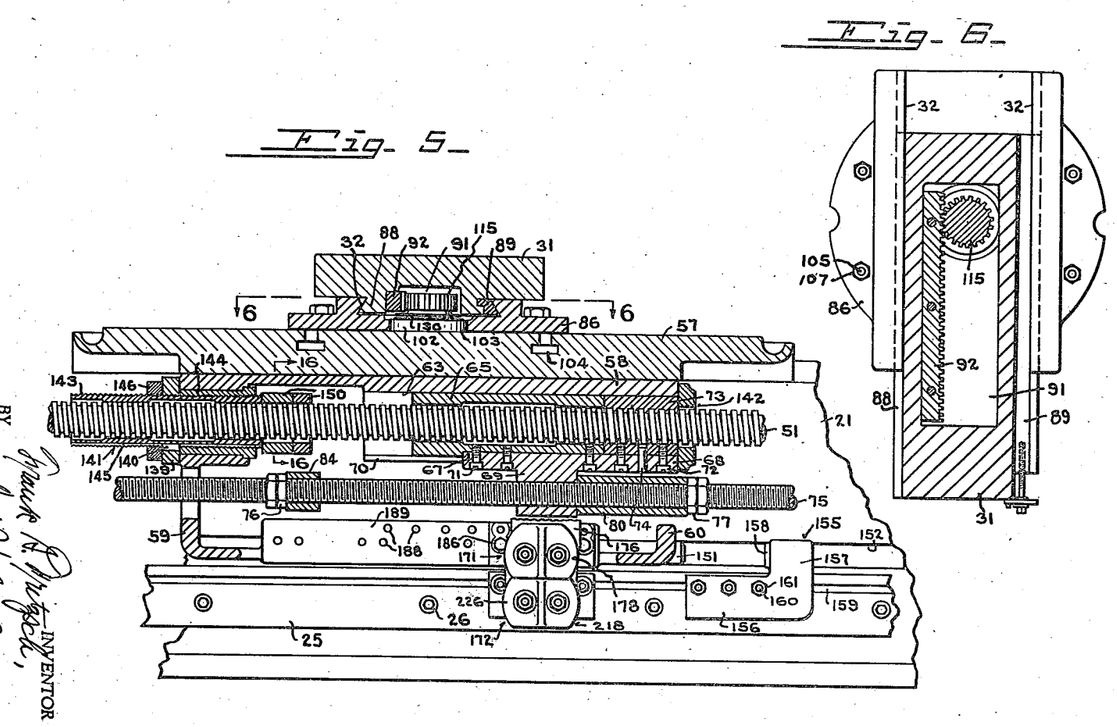
Fig. 5 is a front elevation of my improved device, partly broken away, and partly in vertical section on the irregular line 5—5 of Fig. 3.
Fig. 6 is a horizontal cross-section of the same, taken on the line 6—6 of Fig. 5, showing a detail of the cross-slide moving means.
Figure 7:
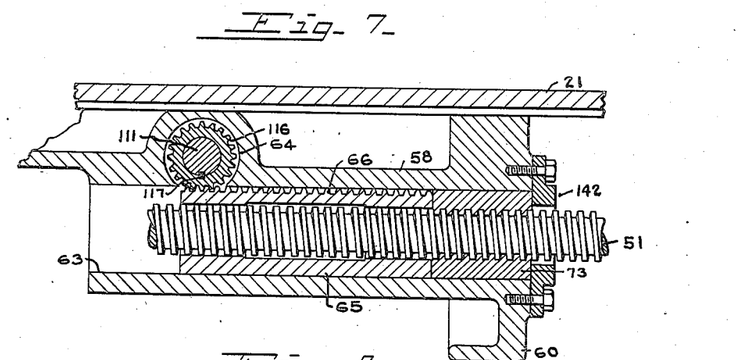
Fig. 7 is a horizontal sectional detail view, taken in the plane of the line 7—7 of Fig. 3, illustrating the normal driving means for the upright shaft.
Figure 8:
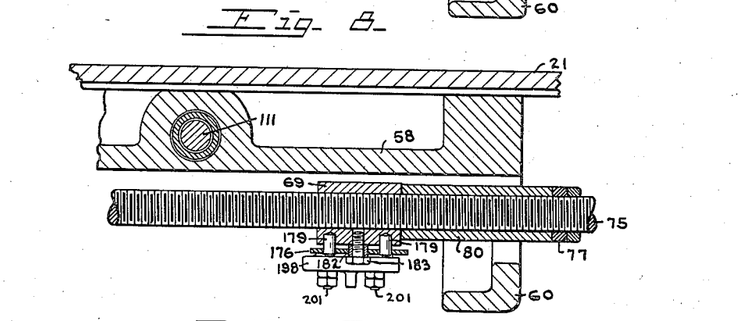
Fig. 8 is a horizontal sectional detail view of my improved device, taken in the plane of the line 8—8 of Fig. 3.
Figures 9, 10:
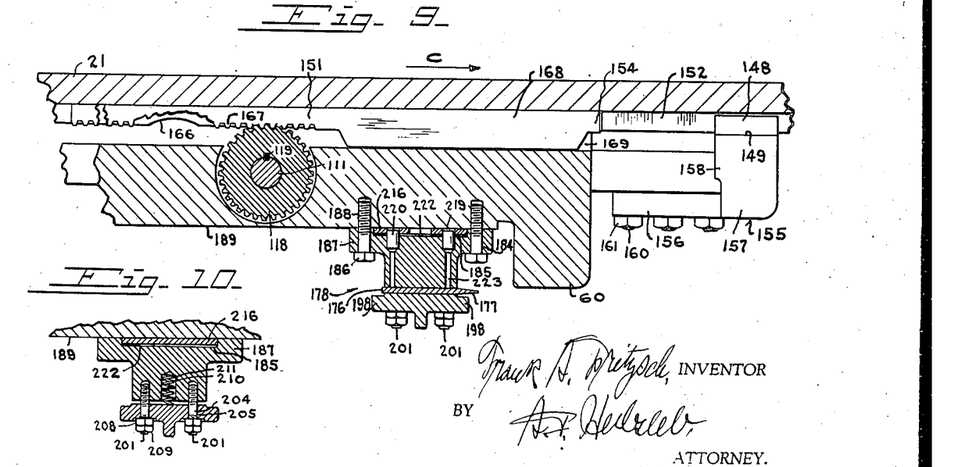
Fig. 9 is a horizontal sectional detail view taken in the plane of the irregular line 9—9 of Fig. 3, and partly broken away, and showing the direction control rack moving and control means.
Fig. 10 is a horizontal sectional detail view of the friction control means mounted on the carriage, taken on the line 10—10 of Fig. 3.
Figure 11:
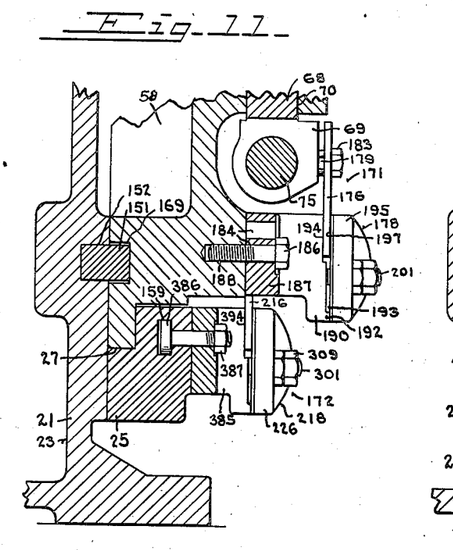
Fig. 11 is a vertical cross-section, taken on the line 11—11 of Fig. 1, illustrating the retarding and control means between the feed nut and rack structure and the bed and the direction control carriage moving rack, and partly broken away.
Figure 12:
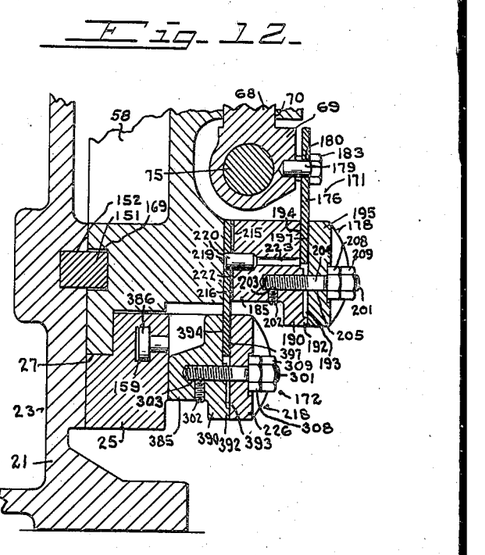
Fig. 12 is a vertical cross-section of the same taken on the line 12—12 of Fig. 1, and partly broken away.
Figures 13, 14, 15:
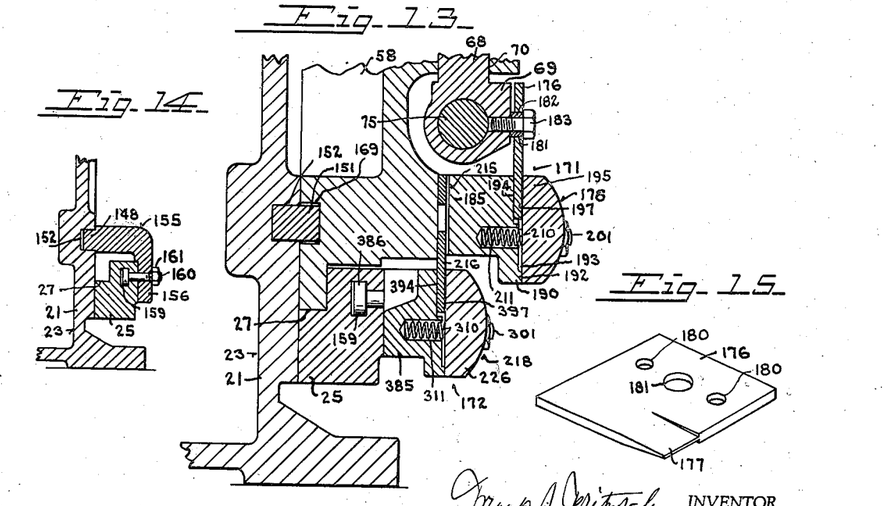
Fig. 13 is a vertical cross-section of the same, taken on the line 13—13 of Fig. 1, and partly broken away.
Fig. 14 is a vertical cross-section, illustrating the stop for the direction control rack, and taken on the irregular line 14—14 of Fig. 1, and partly broken away.
Fig. 15 is a perspective view of the friction blade.
Figure 16:
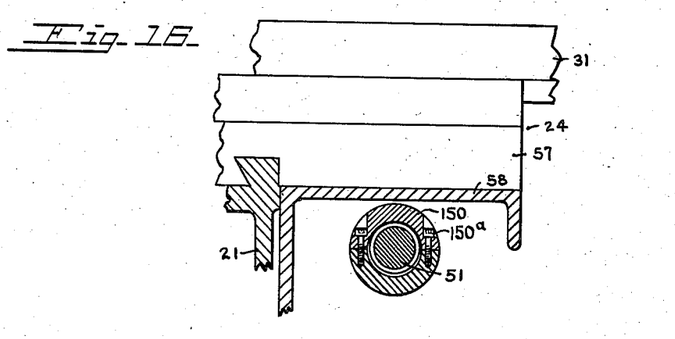
Fig. 16 is a vertical cross-sectional detail view, showing the manner of supporting the extension for the arresting means, taken in the plane of the line 16—16 of Fig. 5.
Figure 17:
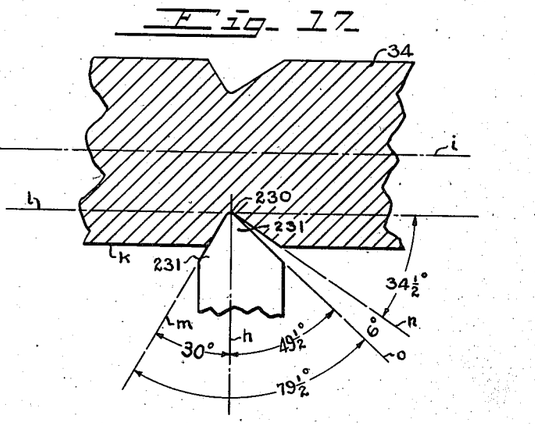
Fig. 17 is a diagrammatic view, illustrating the action of the tool on the work; and, Fig. 18 is a diagrammatic view of a box cycle, including a diagonal cutting into the work by means of my improved device.

Traverse of the carriage toward the head stock may also be definitely limited, which is advisable in certain cycles of movement of the tool. (Figs. 1, 5 and 16.) Such stoppage of the carriage may be obtained by stop blocks 147 of various lengths and of inverted U-form located about and spaced slightly from the feed screw and arranged to be engaged by the outwardly extending end of the sleeve stop 143. The stop block is provided with a flange 147a secured to the wall of the casing 52 by bolts 147b. Additional stop blocks 147c of selective thicknesses may be screwed to the inner end of the stop block 147 by countersunk screws for further adjustment of the moment of stoppage of the carriage. The inner stop block is arranged to be engaged by said arresting means to adjustably stop the carriage at a definite point lengthwise of the bed, it being assumed that the power rotating the screw will also have been disconnected from the screw by the automatic control mechanism to permit such desired definite stoppage of the carriage without shock. Selective spacer blocks 150 of various lengths may be placed over the feed screw at the inner end of the arresting means 141. These are exemplified as split collars, the parts of which are connected by screws 150a, and are loose about the feed screw so that the feed screw rotates within them, and they normally rest against the inner end of the sleeve stop 143. They form extensions of said sleeve stop.

The lower gear 118 meshes with the teeth of a rack 151 slidable lengthwise in a groove 152, in the bed, in which it is slidably held by the apron. (Figs. 1, 2, 3, 5, 9, 11 and 14.) The rack has an end 154 arranged to coact with a stop 155 adjustably positioned lengthwise of the bed. The stop shown comprises an attaching plate 156 and a bracket 157 extending therefrom and having a head 158 arrranged to be contacted by the direction control rack structure. The bracket has a guide 148 shown as a tongue, which enters the groove 152 and is supported therein, shoulders 149 at the outer ends of the tongue coacting with the outer margins of the walls of said groove. The guide 25 is provided with a T-slot 159 extending lengthwise of the bed, in which the heads of T-bolts 160 are slidably received, the threaded shanks of the bolts extending through holes in the attaching plate 156 and having nuts 161 threaded thereover, for clamping the stop in adjusted positions lengthwise of the bed.

If the feed rack sleeve 65 be spaced from the arresting means 141 at the head stock end of the carriage and longitudinal movement be imparted to said feed rack toward the head stock, the pinion 116, the upright shaft 111 and the cross slide pinion 115 will be rotated to feed the cross slide in the direction of the arrow b, or toward the work (Figs. 2, 3 and 9), and the pinion 118 will be rotated in the same direction for moving the direction control rack 151 in the direction of the arrow c so long as there is space between said rack 151 and the stop 155.

As soon as the control rack strikes the stop, movement of the control rack ceases, but rotation of the pinion 118 continues, with the result that such motion is translated into a rolling motion of the pinion along the stopped control rack, and by reason of the journal connection of its upright shaft with the carriage, produces a longitudinal movement of the carriage along the bed toward the head stock, carrying the upright shaft with it and, to the extent of such movement reducing the speed of transmission of the pinion 115 coacting with the cross slide rack to similarly reduce the speed of transverse movement of the tool, which continues as long as the head stock end of the feed rack structure continues spaced from the arresting means 141 at the head stock end of the carriage. (See Figs. 3, 5, 6, 9, 17 and 18.) A diagonal cutting, as exemplified at 165, is thereby produced in the work, for having the tool deeply enter the work for substantial removal of material and substantial feeding of the tool into the work without detriment to the tool. The reduction of the speed of transmission imparted to the cross slide is beneficial as it reduces the speed of perpendicular transverse cutting by the tool, that is, the transverse cutting of the tool in a direction perpendicular to the ultimate cut surface after the digging in by the tool. This is especially beneficial when employing carbide or other brittle tip tools, during which perpendicular transverse cutting movement the cutting face of the tip of the tool is subjected to greatest strain. Such reduction of speed enables the normal speed of feed of the tool to be increased, such normal speed being the speed of feed throughout the balance of its path of cutting. If the capacity of the tool to withstand damage during such perpendicular transverse cutting be employed to fullest extent in setting up the speed of feed of the tool, the speed of feed of the tool may be increased throughout the balance of the cutting path of the tool, thereby increasing the capacity of the machine.

The arresting means 141 at the head end of the carriage is so set that it is engaged by the feed rack structure 65 upon arrival of the point of the tool at the proper depth, for combinedly feeding the cross-slide and the carriage lengthwise of the work for turning the same. Upon automatic reversal of rotation of the feed screw, the parts are returned to initial positions by opposite movements thereof at speeds determined by the control means.

Means are provided for changing the speed of transmission between the control rack 151 and the upright shaft 111 for changing the speed of movement of the carriage and the angle of the diagonal cutting. (Figs. 4, 9, 11, 12 and 13.) This is exemplified as accomplished by change gears and racks in substitution at the positions of the gear 118 and rack 151. Thus a smaller gear 318 may be substituted for the gear 118 and a thicker rack 351 may be substituted for the rack 151, or substitution of other sizes may be made. The gear may be removed downwardly at a given position lengthwise of the bed where clearance 166 therefor is provided, and the racks may be removed and replaced by lengthwise movement of the same into and out of the slideway 152 for the same.

The respective racks are each provided with a rack portion 167 and a guide portion 168, the rear portion of the rack sliding in the groove 152 and the front portion of the rack sliding in a groove 169 in the rear face of the apron opposite the groove 152. The rack portions 167 may be made of various thicknesses to properly mesh the size of pinion employed.

The cross slide being lighter than the carriage, there normally would be preponderance of cross movement of the cross slide on the carriage to lengthwise movement of the carriage on the bed during separated relation between the feed nut structure and the carriage upon actuation of said feed nut structure. (See Figs. 1, 2, 3, 8, 9, 10, 11, 12 and 13). To insure elected movements between the parts I provide control means 171 between the feed nut structure and the carriage and control means 172 between the carriage and the bed, preferably selectively adjustable and operative, to cause selective connection between the feed nut structure and the carriage and selective release of said connection, selective connection between the carriage and the bed and selective release of said connection, and selective connection between said feed nut structure and the bed and selective release of said connection, in conjunction with the operation and control of the auxiliary driving means between the upright shaft in the carriage and the bed, exemplified as comprising the pinion 118, the rack 151 and the stop 155.

Such control means are exemplified as comprising a friction blade 176 having a wedge end 177 at its lower portion and supported by the traveler block 69 so as to have slight lateral movement thereon in order to adapt itself for engagement with a friction clamp 178. It preferably hangs from the traveler block. (Figs. 8, 9, 11, 12, 13 and 15.) The traveler block is provided with lugs formed by the ends of pins 179 inserted therein. The blade 176 has holes 180 in which said pins are located to support the blade in its lengthwise path of travel, and a hole 181 in which a spacer collar 182 about a bolt 183 is located, the bolt being threaded in the traveler block with the inner end of the collar 182 against the traveler block for slight lateral movement of the blade between the traveler block and the head of the bolt and for holding the blade to the traveler block.

The clamp 178 comprises a base 185 rigidly secured to the lower end of the apron 58. (Figs. 1, 3, 5, 9, 11, 12 and 13.) Bolts 186 pass through selective holes 184 in flanges 187 of said base and are threaded into selective threaded holes 188 in the planed face 189 extending along the lower margin of the apron for securing the base to the carriage. The base is preferably adjustably positioned lengthwise of the carriage by providing said face with a number of said threaded holes selectively spaced at different elevations so that the bolts 186 may be threaded into selective ones of said threaded holes to selectively position the clamp lengthwise of the carriage.

The base has a protuberance 190 extending outwardly from the base 185, and provided with a toe 192, a rabbet 193 thereabove, and a deeper rabbet 194 above the latter, all extending lengthwise of the bed. A clamping shoe 195 coacts with the base. Its lower edge is fulcrumed on the toe 192 and it has a clamping face 197 thereabove coacting with the inner face of the rabbet 194 to resistingly hold the blade 176 therebetween. The shoe is provided with guiding lips 198 to guide the wedge end 177 of the blade into the space between the clamping face 197 and the opposite bottom face of the rabbet 194. These faces are normally separated to form a space for ready entrance of the blade. The blade may be placed in reverse positions on the traveler block so that its wedge end may coact with either recessed end of the clamp in either direction of motion of the feed nut structure lengthwise of the bed.

Threaded studs 201 are threaded in threaded holes in the base and are rotatively fixed therein by set screws 202 threaded into the walls of said holes and entering recesses 203 in said studs to position unthreaded portions 204 of said studs just outside said base in holes 205 in said shoe so that the inner ends of the outer threaded portions of said studs extend into said holes. Clamp nuts 208 and jam nuts 209 are threaded over the outer threaded ends of the studs to adjustably exert the desired clamping action upon the blade in said clamp or to leave said blade free, depending upon the character of work to be performed. A spring 210 (Figs. 10 and 13) located in a hole 211 in said base, resiliently urges the shoe away from said base for ready entrance of the blade 176 into the space between the clamping faces of said base and said shoe.

The base 185 is provided with a rear recess 215, in which a blade 216 is located, this blade, like the blade 176, having a wedge end like the wedge end 177 for readily locating the blade in a releasable clamp 218 on the bed. The blade 216 is provided with holes 219 received about pins 220 in the base 185 and projecting from the wall 222 of said recess so that the blade may be hung thereon in said recess, preferably in reversed positions if desired. The blades 176 and 216 are similarly constructed.

Drift holes 223 in the base coaxial with the holes in which the pins 220 are located permit expulsion of the pins out of the holes by a suitable rod if desired. The recess is slightly longer and deeper than the length and thickness of the blade so that said blade has free lateral play for ready entrance of its wedge end into the clamp 218.

The clamp 218 is provided with a coacting shoe 226. This clamp and shoe are constructed similarly to the clamp 178 and its shoe 195, with the exception that the clamp 218 is devoid of the rear recess 215, as no blade depends therefrom, and the bolts 386 have their heads located in the T-slot 159, along which the bolts are slidable for adjustably positioning the base 385 lengthwise of the bed, the base being clamped in adjusted positions by nuts 387 threaded over the threaded ends of the bolts. Either of the bases 185, 385 may be so adjustably positioned, or by the means shown and described for adjustably positioning the base 185. To obviate repetition of description, the rest of the parts of the clamp 218 are designated by reference numerals similar to the reference numerals which designate similar parts of the clamp 178, but raised to the series 300.

The reversals of movements of the tool toward and from the axis of the work and lengthwise of the work, and the changes in speeds between quick traverse movements and cutting movements toward and from the axis of the work and lengthwise of the axis are obtained by the mechanism in the headstock of the lathe and its control and transmission casing 52 at the head end of the lathe, as more fully shown and described in the Cockburn patent and the Bird and Cockburn patent, hereinbefore mentioned, so that further showing and description of the same is here omitted.

My improved device provides novel means whereby a tool may be employed when formed with an advance cutting edge which is at an acute angle to a plane perpendicular to the axis of the work, or be in such perpendicular plane, or the retreating portion of the nose of the tool be widened (see Fig. 17), to increase the bulk of said nose to strengthen the same, as well as to permit clearance between the latter and the diagonal face being cut in the work, whereby wedging of the tool in the work is prevented, whereby the cutting edges are relieved of all but cutting pressures, whereby the best combined results and smoothest cutting in digging in and in longitudinal feed in the turning operation are obtained, and whereby the nose and body of the tool may be increased in bulk so as to absorb more of the heat from the chip, and providing means whereby more efficient cutting tools for the purposes stated may be employed and the lives of the cutting edges of such tools increased, and whereby cutting edges of high speed material are employable without detriment to such cutting edges.

The advance cutting edge (see Fig. 17), for turning the work 34 for removing excess metal by employment of my invention, may be in the plane in which the cutting point 230 of the tool is located, said plane being represented by the dot and dash line $h$, perpendicular to the axis of rotation of the rotating work, represented by the dot and dash line $i$. The outer circumference of the work which is for instance cylindrical, is represented by the line $k$, and the desired depth of cut is represented by the dot and dash line $l$. With my improved construction the body of the nose of the tool may be increased in breadth by providing the tool with an advancing cutting edge for reducing excess metal, represented by the cutting edge $m$, having, for instance, an advance cutting angle of 30 degrees, for further increasing the amount of metal in the cutting portion or nose 231 of the cutting tool, whereby to further increase its strength and to further absorb more of the heat transmitted from the chips.

As stated, the tool is simultaneously fed toward the axis of the work and longitudinally of the work. Such angular direction of infeed is chosen as may be most beneficial for the work in hand. In the exemplification in Fig. 17 a recommended infeed angle of 34½ degrees is chosen, represented by the dot and dash line $n$. The clearance angle for the tool, represented by the dot and dash line $o$, is exemplified as 6 degrees. If the tool be a straight faced turning tool, having an advance cutting edge perpendicular to the axis of rotation of the work coincident with the cutting point of the tool, such relation of the parts provides a nose of 49½ degrees, and if the tool be provided with a turning edge having an advance angle of 30 degrees, the nose of the tool has a body of 79½ degrees between its clearance angle and its advance cutting angle. These effects may be obtained by having the pinions 115 and 116 of a given diameter, say 20 teeth, and having a pinion 118 of greater diameter, say 29 teeth. These relations between the tool and the work may be varied according to the requirements of the work and the results desired, and the angle of infeed of the tool may be changed from the exemplified 34½ degrees to such angle as may be desired by change of relation between the infeed and the longitudinal feed of the tool in my improved device. Thus if the pinions 115, 116 and 118 be of equal diameter, say 20 teeth, the angle of infeed produced will be 45 degrees.

My improved device provides means whereby such relation of angles may be changed to accommodate various characters of work, various characters of cutting tools and cutting edges thereof, and various rates of feed between the cutting tool and the work, according to the speeds of operation, the depth of cutting, and various other conditions it may be desired to meet in the cutting operation.

Figure 18:
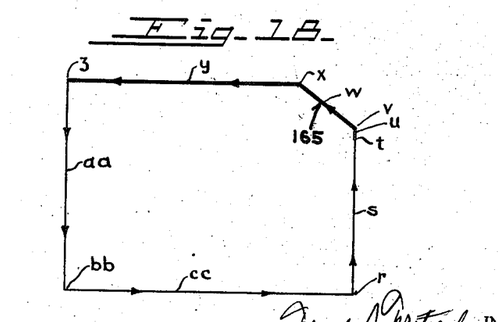

A so-called box cycle is exemplified in Fig. 18 in which the direction of travel of the tool is exemplified by the pointing of the arrows, and in which the paths of the various quick traverse and feeding movements are represented respectively by light and heavy lines. In this exemplification the point $r$ is the point of normal position of the tool, and the point of starting of the tool in the movements representing the cycle. The line $s$ represents the path of the forward rapid traverse movement of the tool for moving the tool quickly toward the work. The traverse movement is obtained by movement of the power rack structure within the apron, with the clamp 178 unclamped and the clamp 218 in clamping relation so as to retard movement of the carriage. At the point $t$ in the path of the tool toward the work the speed of the tool, by suitable control mechanism, part of which is located in the casing 52, is changed from a rapid forward traverse to a slower feed movement, represented by the heavier line. During this movement the rack 151 is moving idly toward the stop 155. At the point $v$ the direction of the path of movement of the tool is changed in my improved device to follow a path, exemplified at $w$, representing a feeding movement to define the infeed angle of the path of the tool into the work. During such angular movement of the tool, the normal transverse feeding movement of the tool which took place during movement of the tool in the path $u$ is modified by a simultaneous lengthwise feeding of the carriage, due to coaction between the rack 151 and the stop 155, reacting on the gear 118 and the shaft 111 for causing rolling of said gear and shaft along the rack and thereby moving the carriage lengthwise along the bed while the cross slide continues its crosswise movement to feed the tool along the path $w$.

During such diagonal movement of the tool, movement of the carriage with relation to the bed is frictionally resisted by the clamp 218, acting frictionally on the blade 216, but permitting slippage between said clamp and blade during lengthwise movement of the carriage along the bed due to coaction between the halted rack 151 and the pinion 118.

This angular movement of the tool continues until the rack and nut structure 66, 73 engages the limiting member 141 on the carriage for moving the carriage, the tool slide and the tool in similar directions lengthwise of the work, beginning at the point $x$ in the cycle, for turning the work lengthwise of the bed to its selected diameter along the heavy feed line $y$.

At the end of feeding movement of the tool lengthwise of the work, suitable controls are actuated, part of which are located in the casing 52 for reversing the direction of rotation of the feed screw and changing the path of movement of the tool at the point $z$, and initiating the return rapid traverse of the cross-slide in the path $aa$ exemplified in the diagram, in connection with suitable speed reduction and tool retraction movements for completing the cutting in said cycle, more fully described in the last aforesaid patents, and not herein more fully discussed.

At this point $z$ the clamps 178, 218 are out of connective relation so that as the cross slide is lighter it will normally be moved in preference to movement of the heavier carriage upon such reversal of rotation of the feed screw by the reverse axial movement of the power rack member 65, 73 until said power rack member engages the arresting means 142 at the tail end of the apron, at the point $bb$, in the cycle, at which point the path of return rapid traverse movement of the tool is changed into the path $cc$ by contact between the feed nut and the arresting means 142 on the carriage, for returning the tool to initial or normal position at the starting point $r$. Such paths of retraction may be changed or be different, being selected to return the tool from the end of feeding to starting positions, as may be desired or the cycle determine.

During such return rapid traverse movement of the cross-slide the normal positional relations between the control means 171, 172 and their blades are restored for again frictionally retardingly controlling the relations of movements between the carriage and the bed in the performance of the desired cycles and dependent on the operative relation of the parts determined by the set-up of the mechanism for the given cycle.

Other cycles of movements may be obtained by my improved device with selective employment or inactive relation of the respective releasable clamps between the traveler block or endwise initial driving structure and the carriage and between the carriage and the bed, and the reversely movable rack and stoop, as will be readily apparent to those skilled in the art, and the peculiarly advantageous paths of the tool in my improved device are obtained by simple means in the absence of cams, templates and pivoted tool supports.

Having thus fully described my invention, what I claim as new and desire to secure by Letters Patent, is:

1. In tool moving means, the combination of a support, a carriage movable along said support, a tool support movable on said carriage crosswise of said first-named support, a rotatable member on said carriage, a driving rack having pinion connection with said rotatable member to rotate said rotatable member, a driving rack having pinion connection with said rotatable member to so move said tool support, and a driven rack having pinion connection with said rotatable member and selective connection with said first-named support to move said carriage lengthwise of said bed and move said last-named pinion lengthwise of said driven rack to reduce the speed of said crosswise movement of said tool support.

2. In tool moving means, the combination of a support, a carriage movable along said support, a tool support arranged to support a tool and movable on said carriage crosswise of said first-named support, a rotatable driving member having journal connection in said carriage, said rotatable driving member provided with three effective pinions, a rack on said tool support, a rack movable lengthwise of said first-named support, and a rack having selective operative connection with said first-named support, and said racks having meshing relations with said respective pinions, for selectively moving said tool support, and said carriage and said tool support, for cutting paths of said tool in different directions.

3. In tool moving means for moving a tool lengthwise, crosswise and at an angle to a surface to be cut, and comprising superposed supports including a tool support, an intermediate support and a third support, a propelling shaft having journal connection in the intermediate support, and racks having geared connections with said shaft, one of said racks being a driving rack to rotate said shaft, another of said racks being a driven rack to move said tool support, and the other rack being normally idle and having selective connection with the third support to move said intermediate support and thereby retard rotation of said shaft.

4. In tool moving means, the combination of a support, a carriage movable along said support, a tool support movable on said carriage crosswise of said first-named support, yieldable holding means between said carriage and said first-named support, an upright shaft having journal connection in said carriage, driving means between said shaft and said tool support to so move said tool support, a linear and rotative drive connection between said first-named support and said shaft to rotate said shaft, and a rotative and linear drive connection between said shaft and said first-named support to move said shaft laterally and by means of its journal connection to so move said carriage resisted by said yieldable holding means.

5. In tool moving means, the combination of a support, a carriage movable along said support, a tool support movable on said carriage crosswise of said first-named support, yieldable holding means between said carriage and said first-named support, an upright shaft having journal connection in said carriage, driving means between said shaft and said tool support to so move said tool support, a linear and rotative drive connection between said first-named support and said shaft to rotate said shaft, yieldable holding means between said linear drive connection and said carriage, a rotative and linear drive connection between said shaft and said first-named support to move said shaft laterally and by means of its journal connection to so move said carriage, selective means between said first-named linear drive connection and said carriage to release said first-named yieldable holding means and to selectively so move said carriage, and selective arresting means between said carriage and said first-named support.

6. In tool moving means, the combination of a support, a carriage movable along said support, a tool support arranged to support a tool and movable on said carriage crosswise of said first-named support, a rotatable driving member for moving said tool support having journal connection in said carriage, a driving element for rotating the latter movable lengthwise of said first-named support and having spaced operative connection with said carriage for moving said carriage, yieldable holding means between said carriage and said first-named support, and a selectively operative driving connection between said rotatable driving member and said first-named support for rotating said member and moving said carriage by means of said journal connection.

7. In tool moving means, the combination of a support, a carriage movable along said support, a tool support arranged to support a tool and movable on said carriage crosswise of said first-named support, a rotatable driving member for moving said tool support having journal connection in said carriage, a driving element movable lengthwise of said first-named support for rotating the latter, yieldable holding means between said driving element and said carriage, yieldable holding means between said carriage and said first-named support, a selectively operative driving connection between said rotatable driving member and said first-named support for rotating said member and moving said carriage by means of said journal connection in releasing direction between the members of said second-named yieldable holding means, said driving element having spaced operative connection with said carriage for movement in release direction in said second-named yieldable holding means, and means for arresting movement of said carriage.

8. In tool moving means, the combination of a support, a carriage movable along said support, a tool support arranged to support a tool and movable on said carriage crosswise of said first-named support, a rotatable driving member for moving said tool support having journal connection in said carriage, a driving element movable lengthwise of said first-named support for rotating said rotatable driving member, yieldable holding means between said driving element and said carriage, yieldable holding means between said carriage and said first-named support, said driving element having spaced connections with said carriage for moving said carriage, arresting means for said carriage, and a selectively operative driving connection between said rotatable driving member and said first-named support for rotating said member and moving said carriage by means of said journal connection.

9. In tool moving means, the combination of a support, a carriage movable along said support, a tool support arranged to support a tool and movable on said carriage crosswise of said first-named support, a rotatable driving member for moving said tool support having journal connection in said carriage, a driving element movable lengthwise of said first-named support for rotating said rotatable driving member, yieldable holding means between said driving element and said carriage, yieldable holding means between said carriage and said first-named support, said driving element having spaced connections with said carriage for moving said carriage, adjustable arresting means for said carriage, and a selectively operative driving connection between said rotatable driving member and said first-named support for rotating said member and moving said carriage by means of said journal connection, said respective yieldable holding means being constructed for release therein by movement lengthwise of said first-named support between said driving element and said carriage and between said carriage and said first-named support.

10. In tool moving means, the combination of a support, a carriage movable along said support, a tool support arranged to support a tool and movable on said carriage crosswise of said first-named support, a rotatable member having journal connection in said carriage, a driving rack having pinion connection with said rotatable member to rotate said rotatable member, a driven rack having pinion connection with said rotatable member to so move said tool support, and a driven rack having pinion connection with said rotatable member and selective connection with said first-named support to roll the pinion of said last-named pinion connection along said last-named driven rack to reduce the speed of said crosswise movement of said tool and said tool support.

11. In tool moving means, the combination of a support, a carriage movable along said support, a tool support arranged to support a tool and movable on said carriage crosswise of said first-named support, a rotatable driving member for so moving said tool support having journal connection in said carriage, a driving element having gear connection with said rotatable driving member and movable lengthwise of said first-named support in periods of idle relation and moving relation to move said carriage, a second rack having gear connection with said rotatable driving member, and to stop therefor on said first-named support, said last-named rack having sequential periods of idle movement and operative connection with said stop during such period of idle relation of said driving element for sequential crosswise movement and diagonal movement of the tool with relation to said first-named support, and constructed for movement of the tool lengthwise of the work during said moving relation between said driving element and said carriage.

FRANK A. FRITZSCH.